(12) United States Patent
Makino et al.

(10) Patent No.: US 7,040,276 B2
(45) Date of Patent: May 9, 2006

(54) DRIVE SHAFT COUPLING DEVICE

(75) Inventors: Tadaaki Makino, Nukata-gun (JP); Katsumi Mori, Chiryu (JP); Katsunori Furuta, Nagoya (JP)

(73) Assignee: Denso Corporation, Kariya (JP)

( * ) Notice: Subject to any disclaimer, the term of this patent is extended or adjusted under 35 U.S.C. 154(b) by 30 days.

(21) Appl. No.: 10/653,422

(22) Filed: Sep. 3, 2003

(65) Prior Publication Data

US 2004/0074468 A1  Apr. 22, 2004

(30) Foreign Application Priority Data

Sep. 4, 2002  (JP) .............................. 2002-258806

(51) Int. Cl.
*F01L 1/18* (2006.01)

(52) U.S. Cl. .............................. 123/196 R; 123/196 S; 123/90.33

(58) Field of Classification Search ............ 123/196 R, 123/196 S, 197.4, 90.31, 90.33
See application file for complete search history.

(56) References Cited

U.S. PATENT DOCUMENTS 5,231,894 A * 8/1993 Okita et al. ................ 74/606 R
5,252,048 A    10/1993 Fujiwara et al.
5,326,239 A    7/1994 Fujiwara et al.
5,704,315 A * 1/1998 Tsuchida et al. .......... 123/90.16

FOREIGN PATENT DOCUMENTS

| DE | 19857248 A1 | 6/2000 |
|---|---|---|
| EP | 0902186 A1 | 3/1999 |
| JP | EP0902186 A1 * | 3/1999 |
| JP | 2001-263025 | 9/2001 |
| JP | 2002-70681 | 3/2002 |

* cited by examiner

*Primary Examiner*—Henry C. Yuen
*Assistant Examiner*—Jason Benton
(74) *Attorney, Agent, or Firm*—Nixon & Vanderhye P.C.

(57) ABSTRACT

An oil supply means is provided to supply the center portion of a rotating part of an Oldham coupling with oil. The oil spreads from the center of rotation to the outside of the Oldham coupling and makes it possible to prevent the Oldham coupling from wearing. A recess is also provided to direct the oil supplied from an engine to the inward portion of the Oldham coupling. Accordingly, the oil is supplied all over an Oldham projection so that it is possible to prevent the frictional wearing of the Oldham projection disposed inside the Oldham coupling.

3 Claims, 5 Drawing Sheets

DRIVE SHAFT COUPLING DEVICE

CROSS REFERENCE TO RELATED APPLICATION

This application is based upon, claims the benefit of priority of, and incorporates by reference, the contents of Japanese Patent Application No. 2002-258806 filed Sep. 4, 2002.

BACKGROUND OF THE INVENTION

1. Field of the Invention

The present invention relates to a coupling structure of a driven device that is installed in an internal combustion engine and is rotatably driven by the internal combustion engine, and more particularly, to a drive shaft coupling device that coaxially couples a driven shaft of the driven device with a drive shaft of the internal combustion engine.

2. Description of Related Art

Generally, supply pumps for supplying high-pressure fuel to a common rail of an automobile fuel system are similar to that as shown in FIG. 9. The supply pump has a camshaft 51, corresponding to a driven shaft, of a supply pump 50, corresponding to a driven device, that is rotatably driven by an internal combustion engine via transmission means 52 such as a pulley, a gear, or the like.

Automobile part manufacturers desire reducing the cost of common rail fuel injection systems installed in passenger cars. Additionally, there have been reductions in drive peak torque and the sizes of the supply pumps that transmit alternating pressures. Even though supply pumps have been made smaller and their torque has been reduced, a conventional drive system, that is, a system to drive the supply pump via a pulley or a gear, still has a high cost and still requires a large amount of space for its use.

Accordingly, the supply pump must be driven in such a manner that a camshaft of the supply pump must be coaxially disposed with a drive shaft of the internal combustion engine. In this case, it is necessary that an Oldham coupling be utilized between them to account for the shaft misalignment of the drive shaft of the internal combustion engine with the camshaft of the supply pump.

To better explain the problem, an embodiment of the Oldham coupling will be hereinafter described with reference to FIG. 10. An Oldham coupling 60 shown in FIG. 10 comprises a union 61 secured to the drive shaft of an internal combustion engine, a coupling plate 62 which is fitted into first grooves 61a formed in the union 61 in such a manner as to extend in a direction orthogonal to an axial direction. The coupling plate 62 further has arm portions 62a slidable along the first groove 61a, and an Oldham projection 63 which is slidably fitted into a second groove 62b formed in the coupling plate 62 in such a manner as to extend to a direction orthogonal to the arm portion 62a. The Oldham projection 63, as shown in FIGS. 11A and 11B, is formed at an end of the camshaft 51 of the supply pump 50.

In the Oldham coupling 60 in the above structure, the Oldham projection 63 is narrow in width, because the width of the Oldham projection 63 is decided by the diameter of the camshaft 51. When the Oldham projection 63 is narrow in width like this, an edge 63a, which is a hatched section of FIG. 10, of the Oldham projection 63 collides hard with the second groove 62b of the coupling plate 62. Furthermore, the Oldham projection 63 is fitted into the coupling plate 62 disposed in the union 61. As a result, oil does not get into a joint sliding portion of the Oldham projection 63 even if the oil is sprayed from the outside in a jet. This creates a lubrication deficiency. Accordingly, since the Oldham projection 63 and the coupling plate 62 become heavily worn down, backlash, that is, essentially a gap, occurs in the joint portion between the Oldham projection 63 and the coupling plate 62. When backlash is present, there is a possibility that an impact load occurring in the bottom of the Oldham projection 63 will damage the Oldham projection 63. The impact of any backlash also causes noise.

Furthermore, there is a possibility that dust and shavings generated by contact and wear will adversely affect other parts and devices. In other words, the oil containing the wearing dust will be circulated to an oil pump, for example. This may cause a malfunction in the oil pump and/or clog oil pump paths. Therefore, conventionally, it is undesirable to drive the supply pump, the camshaft of which is disposed coaxially with the drive shaft of the internal combustion engine, due to the defects described above.

The supply pump is adopted as one example of the driven device, as shown by the above, but many other types of driven devices cannot adopt a structure in which the driven shaft of the driven device is disposed coaxially with the drive shaft of the internal combustion engine, due to the reasons described above.

SUMMARY OF THE INVENTION

In view of the foregoing circumstances, an object of the present invention is to provide a drive shaft coupling device which reduces wear on an Oldham coupling situated between a drive shaft and a driven shaft, even in an adopting structure, in which the driven shaft of a driven device is disposed coaxially to the drive shaft of an internal combustion engine.

According to a first aspect of the invention, a drive shaft coupling device supplies a joint sliding portion of an Oldham coupling with oil by an oil supply means within an internal combustion engine. Accordingly, it is possible to prevent the Oldham coupling from wearing, even if it is an adopted structure in which a driven shaft of a driven device, coaxially disposed with a drive shaft of the internal combustion engine, is driven. As a result, it is possible to adopt a structure in which the driven shaft of the driven device, coaxially disposed with the drive shaft of the internal combustion engine, is driven.

According to a second aspect of the invention, a drive shaft coupling device supplies the center portion of rotation of the Oldham coupling with oil flowing through an oil supply path formed in the approximate center of the drive shaft. Supplying oil to the center portion of rotation of the Oldham coupling causes the oil to spread from the center of the Oldham coupling to its outer portions, making it is possible to supply the oil to a large area of the Oldham coupling.

According to a third aspect of the invention, the oil supply path is provided with an orifice for adjusting an amount of oil supply. Accordingly, the oil is supplied to the Oldham coupling in a high-speed jet, so that it is possible to increase the lubrication of the Oldham coupling.

According to a fourth aspect of the invention, the drive shaft coupling device is provided with an inward directed oil supply means which is composed of a groove or a hole for directing the oil, supplied by the oil supply means, from an oil supply location to the inward portions of the Oldham coupling. Since the oil is supplied to the inside of the Oldham coupling like this, it is possible to supply the oil to the joint sliding portion of the Oldham coupling to a location away from the oil supply location, so that resistance to wear is further enhanced.

According to a fifth aspect of the invention, the drive shaft coupling device is provided with a return path for returning the oil falling to the bottom of the lubricating chamber by gravity to the internal combustion engine. Accordingly, the oil supplied to the Oldham coupling is smoothly returned to the internal combustion engine.

In the drive shaft coupling device according to a sixth aspect of the invention, a supply pump for supplying a common rail with high-pressure fuel is adopted as the driven device. As a result of this, it is possible to prevent the Oldham coupling, coupling the drive shaft to the camshaft, from wearing, even if it is an adopted structure in which the camshaft of the supply pump, coaxially disposed with a drive shaft of the internal combustion engine, is driven. In other words, it is possible to adopt a structure in which the camshaft of the supply pump, coaxially disposed with the drive shaft of the internal combustion engine, is driven.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
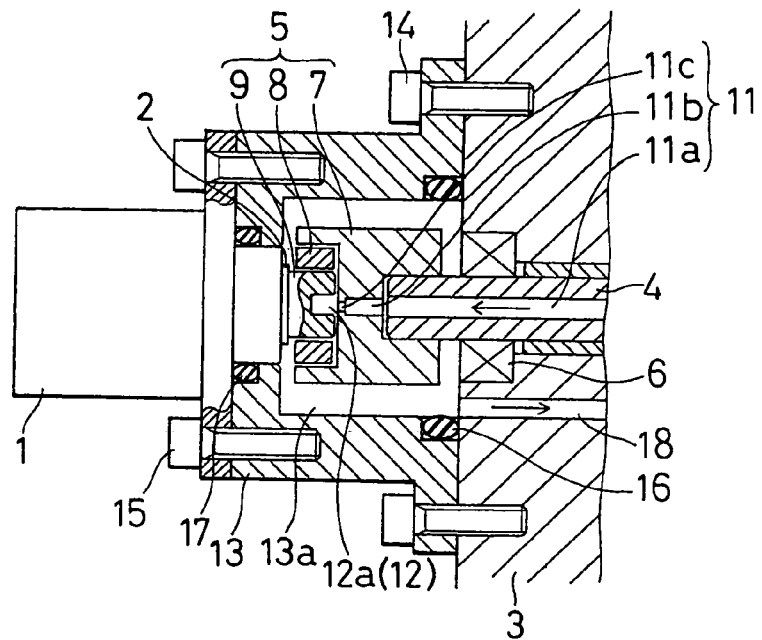
FIG. 1 is a schematic cross-sectional view of a drive shaft coupling device of a first embodiment of the present invention.

The following description of the preferred embodiments is merely exemplary in nature and is in no way intended to limit the invention, its application, or uses.

(First Embodiment)

An embodiment will be hereinafter described with reference to FIGS. 1 to 4, in which the present invention is applied to a drive shaft coupling device of a supply pump in a common rail type of fuel injection system. The structure of the drive shaft coupling device according to the first embodiment will be described with reference to FIG. 1.

The drive shaft coupling device is applied to a structure in which a camshaft 2 of a supply pump 1 (corresponding to a driven device) is disposed coaxially with a drive shaft 4 installed in an internal combustion engine (hereinafter engine 3), and the camshaft 2 is driven by the drive shaft 4. An Oldham coupling 5 intervenes between the camshaft 2 and the drive shaft 4, to absorb the shaft misalignment of the camshaft 2 and the drive shaft 4 using a slide.

The foregoing supply pump 1, which includes a feed pump for pumping fuel from a fuel tank (not shown), and a high-pressure discharge pump for pumping the pumped, high pressure fuel to supply it to a common rail (a fuel accumulator, not shown), is provided with the camshaft 2 for driving the feed pump and the high-pressure discharge pump.

The supply pump 1 of this embodiment is utilized in a common rail fuel system for a passenger car, and has reduced peak torque by alternating the pumping of the high-pressure discharge pump, and is reduced in size, weight and cost.

The engine 3, which is internally lubricated by engine oil discharged from an oil pump (not shown) installed in the engine 3, is provided with the drive shaft 4 rotatably driven by running torque generated by the engine 3 to drive the supply pump 1. The drive shaft 4 is so provided as to protrude from the engine 3 to drive the supply pump 1, and an oil seal 6 is disposed between the engine 3 and the drive shaft 4.

An existing rotation shaft, such as an engine camshaft and the like, provided in the engine 3 may be used as the drive shaft 4, or a shaft may be newly provided for driving the supply pump 1.

Figure 2:
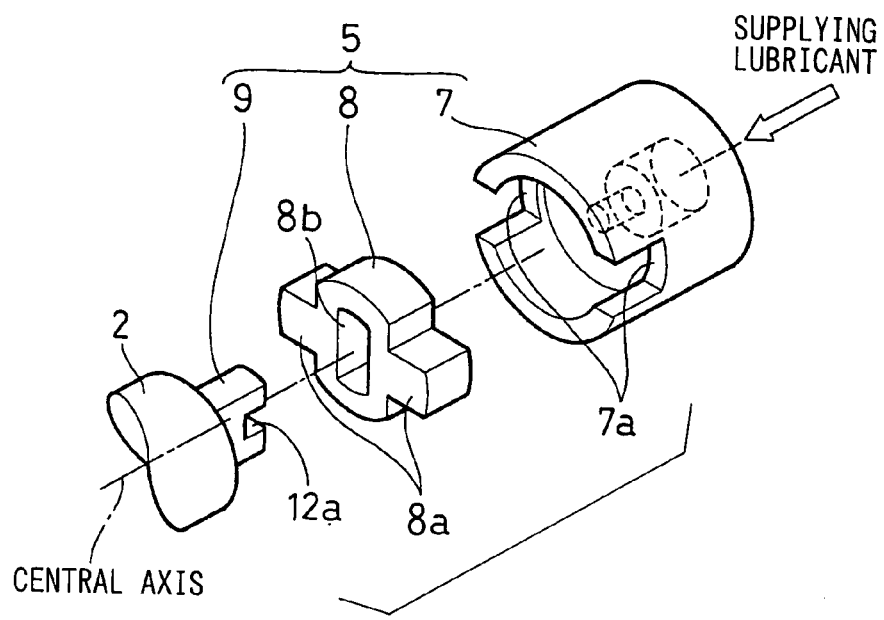
FIG. 2 is an exploded perspective view of an Oldham coupling of the first embodiment of the present invention.

The structure of the Oldham coupling 5 will be hereinafter described with reference to FIGS. 1 and 2. The Oldham coupling 5 comprises a union 7 coupled to the drive shaft 4 of the engine 3, a coupling plate 8 having arm portions 8a which are fitted into first grooves 7a, which are formed in the union 7 in such a manner as to extend in a direction orthogonal to an axial direction. The arm portions 8a move slidably along the first grooves 7a, while an Oldham projection 9, which is fitted into a second groove 8b extending in a direction orthogonal to the arm portions 8a formed in the coupling plate 8, slides within the second groove 8b. The Oldham projection 9 is formed at an end of the camshaft 2 of the supply pump 1.

In the Oldham coupling 5 in the above structure, the Oldham projection 9 is narrow in width, so that the edge of the Oldham projection 9 collides hard with the internal surface of the second groove 8b of the coupling plate 8. Since the Oldham projection 9 is fitted into the coupling plate 8 disposed in the union 7, it is difficult for the oil to get into the joint sliding portion 9a of the Oldham projection 9 even if the oil is sprayed from the outside in a jet. Therefore, this lubrication deficiency causes the occurrence of wear on the Oldham projection 9. Furthermore, since the dust due to wear is hard to remove from the Oldham coupling 5, the Oldham projection 9 becomes heavily worn. Accordingly, the drive shaft coupling device according to the present embodiment is provided with an oil supply means 11 for supplying the center portion of rotation of the Oldham coupling 5 with part of the oil discharged from the oil pump of the engine 3, for the purpose of preventing the Oldham coupling 5 from wearing.

The oil supply means 11 supplies the center portion of rotation of the Oldham coupling 5 with the oil, passing through an oil supply path 11a formed at the approximately center of the drive shaft 4 and an oil path 11b formed at the approximately center of the union 7. An orifice 11c is formed in the oil path 11b to adjust an amount of oil supplied to the Oldham coupling 5 and supply the center portion of rotation of the Oldham coupling 5 with the oil in a jet. Since the oil is supplied to the center of rotation of the Oldham projection 9, which is the center portion of rotation of the Oldham coupling 5, like this, the oil spreads from the center to the outside by the rotation of the Oldham coupling 5.

Figure 3:
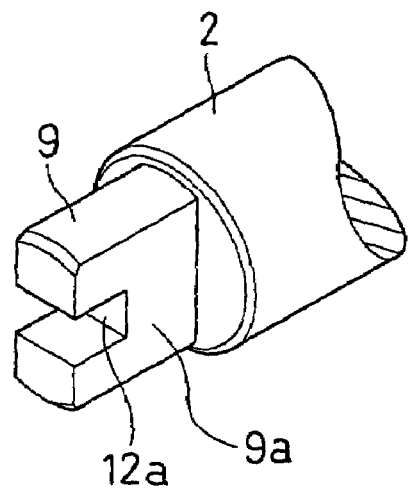
FIG. 3 is a perspective view of an Oldham projection of the first embodiment of the present invention.
Figure 4A:
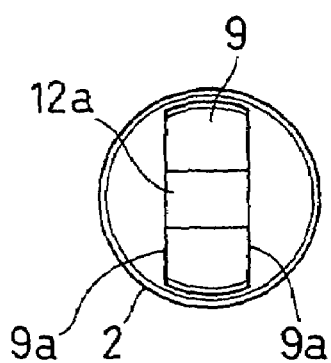
FIG. 4A is a front view of the Oldham projection of the first embodiment of the present invention.
Figure 4B:
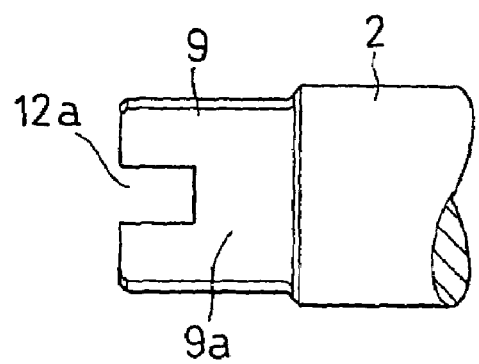
FIG. 4B is a side view of the Oldham projection of the first embodiment of the present invention.

The Oldham coupling 5 is provided with an inward oil supply means 12 for leading the oil supplied by the oil supply means 11 to the inside of the Oldham coupling 5. Referring to FIGS. 3 and 4, the inward oil supply means 12 of the first embodiment is a recess 12a formed in the center portion of the Oldham projection 9, and the inward oil supply means 12 (the recess 12a) makes the oil supplied by the oil supply means 11 reach the inward portion of the Oldham projection 9.

As described above, since the oil is supplied to the inward portion of the Oldham projection 9, it is possible to certainly supply the oil to the joint sliding portion at a location away from an oil supply side (especially, to an edge of the Oldham projection 9 away from the oil supply location), in order to realize high resistance to wear.

The drive shaft coupling device is provided with a cover 13 which forms a lubricating chamber 13a by covering the periphery of the Oldham coupling 5, and the supply pump 1 is secured to the cover 13. The cover 13, which is in the form of an approximate container for covering the Oldham coupling 5, is secured to the engine 3 with bolts 14. The supply pump 1 is secured to an end of the cover 13 with bolts 15. O-rings 16 and 17 are so disposed between the cover 13 and the engine 3, and between the cover 13 and the supply pump 1, as to prevent the oil inside the lubricating chamber 13a from leaking outside.

A return path 18 for returning the oil, leading to the bottom of the lubricating chamber 13a into the engine 3, is formed in the engine 3. Accordingly, it is possible to smoothly return the oil, which is supplied by the oil supply means 11 and is fallen to the bottom of the lubricating chamber 13a by gravity after lubricating the Oldham coupling 5, into the engine 3.

In this embodiment, as described above, it is possible to reduce wear on the Oldham coupling 5 even if the cam shaft 2 of the supply pump 1, disposed coaxially with the drive shaft 4 of the engine 3, is driven. Especially, the inward oil supply means 12, that is, the recess 12a, makes it possible to certainly supply the oil to the edge of the Oldham projection 9 away from the oil supply location.

Thus, it is possible to prevent wear on the Oldham projection 9, even if the Oldham projection 9 formed in the end of the camshaft 2 is narrow in width and the edge of the Oldham projection 9 collides hard with the coupling plate 8. The oil is certainly supplied to each of the joint sliding portions of the coupling plate 8, which is on the periphery of the Oldham projection 9, and the union 7 by centrifugal force, as a matter of course, so that it is possible to prevent each of the joint sliding portions of the Oldham coupling 5 from wearing. If wear of the Oldham coupling 5 is prevented in this manner, it is possible to prevent backlash, which may otherwise occur in the Oldham coupling 5.

As a result of this, it is possible to solve the problem that an impact load, occurring in the bottom of the Oldham projection 9 due to the occurrence of the backlash, might damage the Oldham projection 9. It is also possible to solve the problem of noise, which occurs during backlash.

Furthermore, it is possible to prevent the generation of dust due to wear because of the actual reduction in wear. Accordingly, the dust generated by the wear does not adversely affect the other parts and devices. In other words, there are no oil pump breakage problems associated with oil containing any wearing dust. Furthermore, it is possible to prevent the problem of the oil path in the engine 3 from clogging with the oil containing any wearing dust.

(Second Embodiment)

Figure 5:
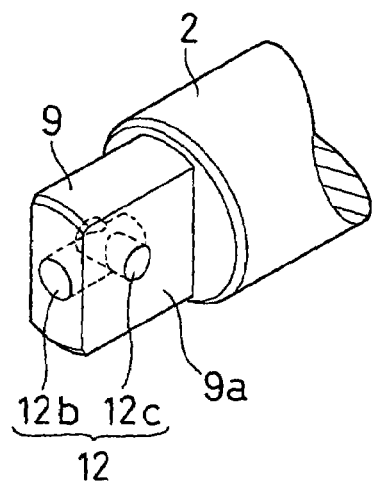
FIG. 5 is a perspective view of an Oldham projection of a second embodiment of the present invention.
Figure 6A:
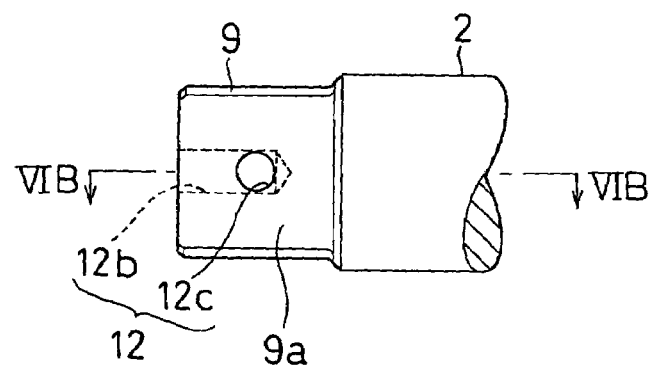
FIG. 6A is a side view of the Oldham projection of the second embodiment of the present invention.
Figure 6B:
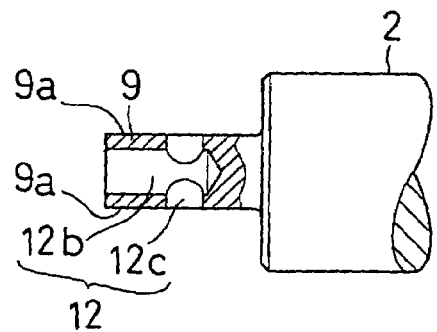
FIG. 6B is a partial cross-sectional view of the Oldham projection of the second embodiment of the present invention.

A second embodiment will be described with reference to FIGS. 5 and 6. In this second embodiment, the inward oil supply means 12 is modified. The inward oil supply means 12 according to the second embodiment is constituted by first and second holes 12b and 12c formed in the Oldham projection 9. The first hole 12b is formed in the middle of the end surface of the Oldham projection 9 in an axial direction, and the oil supplied by the oil supply means 11 is supplied thereto. The second hole 12c, penetrating the approximate middle of the planar surface of the Oldham projection 9 (or the deep portion of the Oldham projection 9), is connected to the first hole 12b inside the Oldham projection 9 in order to direct the oil supplied by the oil supply means 11 through the first hole 12b to the surface of the Oldham projection 9 on the side facing away from the oil supply location.

Providing the inward oil supply means 12 (the first and second holes 12b and 12c), as described in the second embodiment, makes it possible to supply the oil to the inside of the Oldham projection 9, so that it is possible to obtain the same effect as in the first embodiment.

(Third Embodiment)

Figure 7:
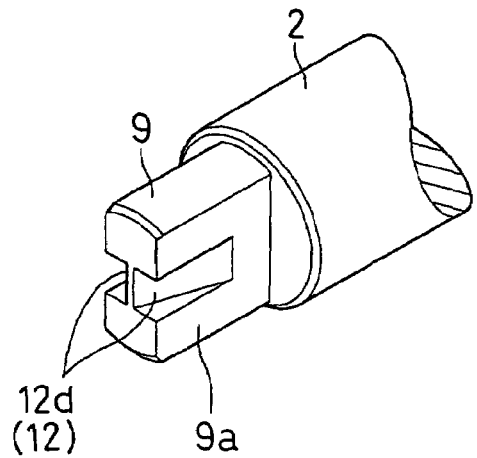
FIG. 7 is a perspective view of an Oldham projection of a third embodiment of the present invention.
Figure 8:
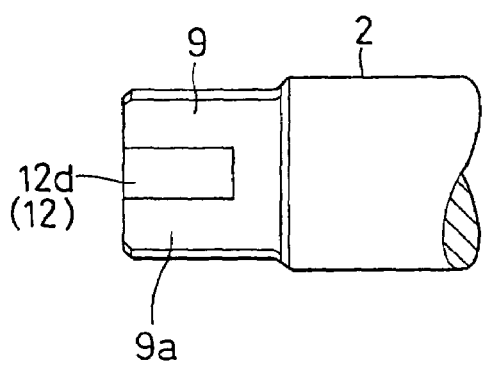
FIG. 8 is a side view of the Oldham projection of the third embodiment of the present invention.
Figure 9:
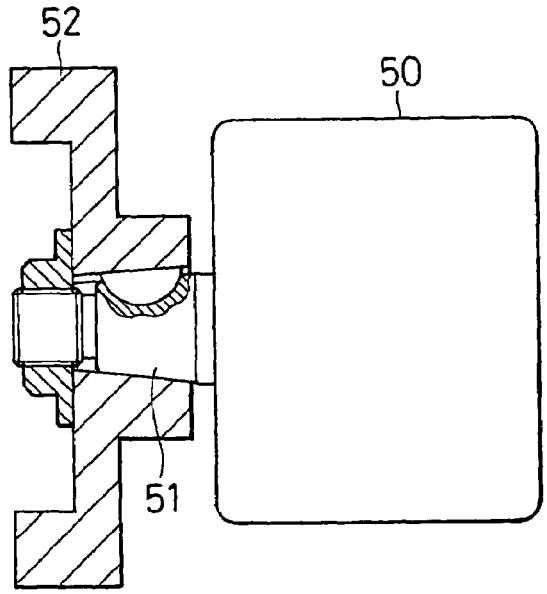
FIG. 9 is a side view showing an actuator of a prior art supply pump.
Figure 10:
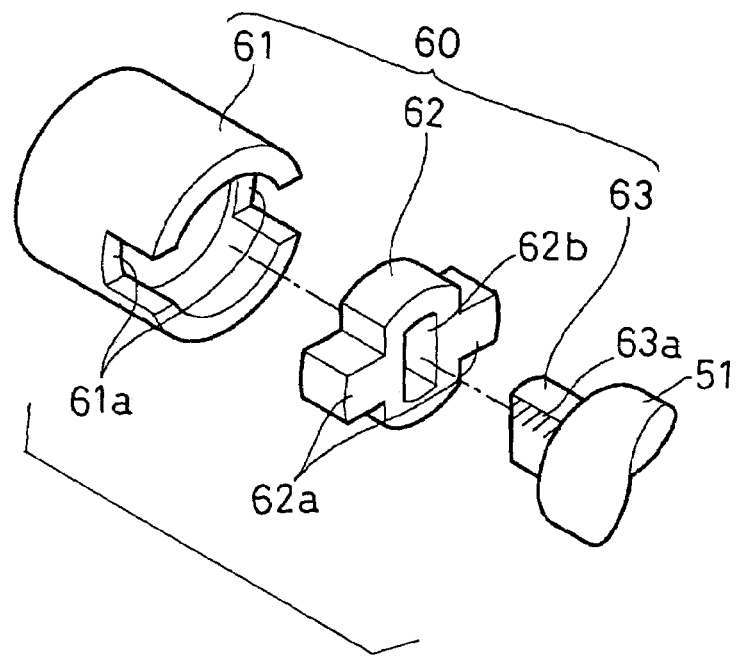
FIG. 10 is a perspective view of an Oldham type coupling, shown as related art.
Figure 11A:
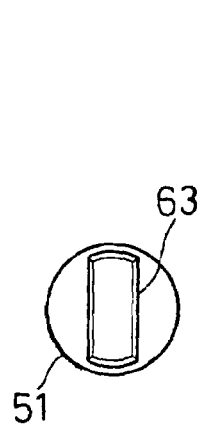
FIG. 11A is an explanatory end view of an Oldham type projection formed in a camshaft of a supply pump, shown as related art.
Figure 11B:
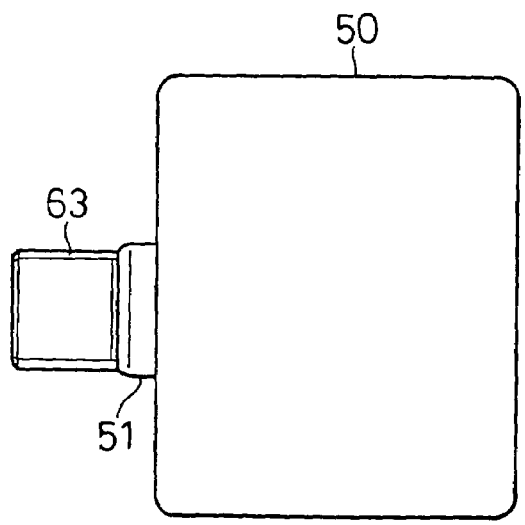
FIG. 11B is an explanatory side view of an Oldham type projection formed in a camshaft of a supply pump, shown as related art.

A third embodiment will be described with reference to FIGS. 7 and 8. The inward oil supply means 12 is modified in this third embodiment too. The inward oil supply means 12 according to the third embodiment is constituted by taper grooves 12d formed on both sides of the planar surface of the Oldham projection 9. The two taper grooves 12d are grooves formed in a tapered shape in such a manner as to direct the oil, supplied by the oil supply means 11 to the middle of the end surface of the Oldham projection 9, to the approximate middle of the planar surface of the Oldham projection 9, or to the deep portion of the Oldham projection 9.

Providing the inward oil supply means 12 (the taper grooves 12d), as described in the third embodiment, makes it possible to supply oil to the inside of the Oldham projection 9, so that it is possible to obtain the same effect as in the first embodiment.

Modified Example

The supply pump 1 is used as an example of the drive device in the above embodiment, but the present invention is applicable to other drive devices (auxiliary equipment such as an alternator, an air-conditioner compressor and the like) driven by the engine 3. The structure of the Oldham coupling 5 described in the above embodiments is just one example. Therefore, the present invention is applicable to an Oldham coupling having different structures.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A drive shaft coupling device comprising:
   a drive shaft provided in an internal combustion engine internally lubricated with oil, wherein torque generated by the internal combustion engine rotatably drives said drive shaft;
   a driven device attached to said internal combustion engine, wherein said driven device has a driven shaft that is coaxially disposed with said drive shaft and is driven by said drive shaft;
   an Oldham coupling disposed between said drive shaft and said driven shaft to absorb shaft misalignment of said drive shaft and said driven shaft using a slide; and
   oil supply means for supplying a joint sliding portion of said Oldham coupling with part of said oil flowing within said internal combustion engine,
   wherein an approximate center of said drive shaft defines an oil supply path and said oil supply means supplies a center portion of rotation of said Oldham coupling with oil,
   wherein said Oldham coupling defines an orifice in said oil supply path for adjusting an amount of oil supply,
   wherein said Oldham coupling is provided with inward oil supply means, said inward oil supply means defining a groove for directing said oil supplied by said oil supply means from an oil supply area to an inward portion of said Oldham coupling,
   said Oldham coupling further comprising:
      a union formed at a side of said drive shaft;
      a coupling plate having an arm portion slidable along a first groove formed in said union, said coupling plate fitted into said first groove that extends in an orthogonal direction with respect to an axial direction of said union;
      an Oldham projection, which is slidably fitted into a second groove extending in the orthogonal direction with respect to the arm portion formed in the coupling plate, said Oldham projection formed at an end of a driven shaft; and
   an oil supply means defining:
      a recess disposed in an appropriate middle of an end surface of the Oldham projection so that oil supplied from the oil supply means is led thereinto.

2. A drive shaft coupling device comprising:
   a drive shaft provided in an internal combustion engine internally lubricated with oil, wherein torque generated by the internal combustion engine rotatably drives said drive shaft;
   a driven device attached to said internal combustion engine, wherein said driven device has a driven shaft that is coaxially disposed with said drive shaft and is driven by said drive shaft;
   an Oldham coupling disposed between said drive shaft and said driven shaft to absorb shaft misalignment of said drive shaft and said driven shaft using a slide; and
   oil supply means for supplying a joint sliding portion of said Oldham coupling with part of said oil flowing within said internal combustion engine,
   wherein an approximate center of said drive shaft defines an oil supply path and said oil supply means supplies a center portion of rotation of said Oldham coupling with oil,
   wherein said Oldham coupling defines an orifice in said oil supply path for adjusting an amount of oil supply,
   wherein said Oldham coupling is provided with inward oil supply means, said inward oil supply means defining a groove for directing said oil supplied by said oil supply means from an oil supply area to an inward portion of said Oldham coupling,
   said Oldham coupling further comprising:
      a union formed at a side of said drive shaft;
      a coupling plate having an arm portion slidable along a first groove formed in said union, said arm portion fitted into said first groove, said arm portion extending in an orthogonal direction with respect to an axial direction of said union;
      an Oldham projection slidably fitted into a second groove that extends in an orthogonal direction with respect to the arm portion formed in the coupling plate, said Oldham projection formed at an end of a driven shaft; and
   the oil supply means defining:
      a first hole formed from the middle of the end surface of the Oldham projection in an axial direction of the Oldham projection, so that oil is supplied to an interior of said Oldham projection via the hole;
      a second hole intersecting said first hole and penetrating the approximate middle of the slidably connecting planar surface of the Oldham projection.

3. A drive shaft coupling device comprising:
   a drive shaft provided in an internal combustion engine internally lubricated with oil, wherein torque generated by the internal combustion engine rotatably drives said drive shaft;
   a driven device attached to said internal combustion engine, wherein said driven device has a driven shaft that is coaxially disposed with said drive shaft and is driven by said drive shaft;
   an Oldham coupling disposed between said drive shaft and said driven shaft to absorb shaft misalignment of said drive shaft and said driven shaft using a slide; and
   oil supply means for supplying a joint sliding portion of said Oldham coupling with part of said oil flowing within said internal combustion engine,
   wherein an approximate center of said drive shaft defines an oil supply path and said oil supply means supplies a center portion of rotation of said Oldham coupling with oil,
   wherein said Oldham coupling defines an orifice in said oil supply path for adjusting an amount of oil supply,
   wherein said Oldham coupling is provided with inward oil supply means, said inward oil supply means defining a groove for directing said oil supplied by said oil supply means from an oil supply area to an inward portion of said Oldham coupling,
   said Oldham coupling further comprising:
      a union formed at a side of said drive shaft;
      a coupling plate having an arm portion slidable along a first groove formed in said union, said coupling plate fitted into said first groove, said arm portion extending in an orthogonal direction with respect to an axial direction of said union;
      an Oldham projection slidably fitted into a second groove that extends in an orthogonal direction with respect to the arm portion formed in the coupling plate, said Oldham projection formed at an end of a driven shaft; and
   the oil supply means defining;
      a tapered groove formed in the approximate middle of the end surface of the Oldham projection in such a manner as to lead oil supplied by the oil supply means to the approximate middle of both slidably connecting planar surfaces of the Oldham projection.

* * * * *